United States Patent
Urtasun et al.

(10) Patent No.: US 12,051,001 B2
(45) Date of Patent: Jul. 30, 2024

(54) MULTI-TASK MULTI-SENSOR FUSION FOR THREE-DIMENSIONAL OBJECT DETECTION

(71) Applicant: UATC, LLC, Mountain View, CA (US)

(72) Inventors: Raquel Urtasun, Toronto (CA); Bin Yang, Toronto (CA); Ming Liang, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/972,249

(22) Filed: Oct. 24, 2022

(65) Prior Publication Data

US 2023/0043931 A1   Feb. 9, 2023

Related U.S. Application Data

(63) Continuation of application No. 16/654,487, filed on Oct. 16, 2019, now Pat. No. 11,494,937.

(Continued)

(51) Int. Cl.
*G06N 3/084* (2023.01)
*G01S 17/89* (2020.01)
(Continued)

(52) U.S. Cl.
CPC .............. *G06N 3/084* (2013.01); *G01S 17/89* (2013.01); *G05D 1/0088* (2013.01);
(Continued)

(58) Field of Classification Search
CPC ......... G06N 20/00; G01S 17/89; G06T 11/60; G05D 2201/0213
See application file for complete search history.

(56) References Cited

U.S. PATENT DOCUMENTS

2018/0141562 A1\* 5/2018 Singhal ................. A61B 5/165
2018/0348346 A1\* 12/2018 Vallespi-Gonzalez ......................
                                                          G01S 7/4861
(Continued)

OTHER PUBLICATIONS

Learning Robust Control Policies for End-to-End Autonomous Driving from Data-Driven Simulation Alexander Amini1 , Igor Gilitschenski1 et al. Jan. 2020 (Year: 2020).\*
(Continued)

*Primary Examiner* — Nancy Bitar
(74) *Attorney, Agent, or Firm* — Dority & Manning, P.A.

(57) ABSTRACT

Provided are systems and methods that perform multi-task and/or multi-sensor fusion for three-dimensional object detection in furtherance of, for example, autonomous vehicle perception and control. In particular, according to one aspect of the present disclosure, example systems and methods described herein exploit simultaneous training of a machine-learned model ensemble relative to multiple related tasks to learn to perform more accurate multi-sensor 3D object detection. For example, the present disclosure provides an end-to-end learnable architecture with multiple machine-learned models that interoperate to reason about 2D and/or 3D object detection as well as one or more auxiliary tasks. According to another aspect of the present disclosure, example systems and methods described herein can perform multi-sensor fusion (e.g., fusing features derived from image data, light detection and ranging (LIDAR) data, and/or other sensor modalities) at both the point-wise and region of interest (ROI)-wise level, resulting in fully fused feature representations.

20 Claims, 8 Drawing Sheets

Related U.S. Application Data

(60) Provisional application No. 62/858,489, filed on Jun. 7, 2019, provisional application No. 62/768,790, filed on Nov. 16, 2018.

(51) Int. Cl.

| | |
|---|---|
| *G05D 1/00* | (2024.01) |
| *G06N 20/00* | (2019.01) |
| *G06T 7/55* | (2017.01) |
| *G06T 7/73* | (2017.01) |
| *G06T 11/60* | (2006.01) |
| *G06V 10/80* | (2022.01) |
| *G06V 10/82* | (2022.01) |
| *G06V 20/58* | (2022.01) |
| *G06V 30/19* | (2022.01) |
| *G06V 30/24* | (2022.01) |

(52) U.S. Cl.
CPC .......... *G05D 1/0238* (2013.01); *G06N 20/00* (2019.01); *G06T 7/55* (2017.01); *G06T 7/75* (2017.01); *G06T 11/60* (2013.01); *G06V 10/806* (2022.01); *G06V 10/82* (2022.01); *G06V 20/58* (2022.01); *G06V 30/19173* (2022.01); *G06V 30/2504* (2022.01); *G06T 2207/10024* (2013.01); *G06T 2207/10028* (2013.01); *G06T 2207/20081* (2013.01); *G06T 2207/20221* (2013.01); *G06T 2207/30252* (2013.01)

(56) References Cited

U.S. PATENT DOCUMENTS

| | | | | |
|---|---|---|---|---|
| 2019/0051052 | A1* | 2/2019 | Corazza | G06T 15/60 |
| 2019/0163990 | A1* | 5/2019 | Mei | B60R 11/04 |
| 2019/0243372 | A1* | 8/2019 | Huval | B60W 30/0953 |
| 2019/0272446 | A1* | 9/2019 | Kangaspunta | G01C 21/3859 |

OTHER PUBLICATIONS

Beltran et al, "BirdNet: A 3D Object Detection Framework from Lidar Information", arXiv:1805v1, May 3, 2018, 8 pages.
Chen et al, "3D Object Proposals for Accurate Object Class Detection", Conference on Neural Information Processing Systems, Dec. 7-12, 2015, Montreal, Canada, 10 pages.
Chen et al, "3D Object Proposals Using Stereo Imagery for Accurate Object Class Detection", arXiv:1608v2, Apr. 25, 2017, 14 pages.
Chen et al, "Monocular 3D Object Detection for Autonomous Driving", Conference on Computer Vision and Pattern Recognition, Jun. 26-Jul. 1, 2016, Las Vegas, Nevada, 10 pages.
Chen et al, "Multi-View 3D Object Detection Network for Autonomous Driving", arXiv:1611v2, Apr. 11, 2017, 9 pages.
Du et al, "A General Pipeline For 3D Detection of Vehicles", arXiv:1803v1, Feb. 12, 2018, 7 pages.
Fang et al, "Small-Objectness Sensitive Detection Based on Shifted Single Shot Detector", Multimedia Tools and Applications, vol. 78, 2019, 19 pages.
Geiger et al, "Are We Ready for Autonomous Driving? The Kitti Vision Benchmark Suite", Conference on Computer Vision and Pattern Recognition, Jun. 18-20, 2012, Providence, Rhode Island, 8 pages.
He et al, "Deep Residual Learning for Image Recognition", Conference on Computer Vision and Pattern Recognition, Jul. 21-26, 2017, Honolulu, Hawaii, 9 pages.
He et al, "Mask R-CNN", arXiv:1703v3, Jan. 24, 2018, 12 pages.
Kingma et al, "Adam: A Method for Stochastic Optimization", arXiv:1412v9, Jan. 30, 2017, 15 pages.
Ku et al, "Joint 3D Proposal Generation and Object Detection from View Aggregation", arXiv:1712v4, Jul. 12, 2018, 8 pages.
Liang et al, "Deep Continuous Fusion for Multi-Sensor 3D Object Detection", Conference on Computer Vision, Sep. 8-14, 2018, Munich, Germany, 16 pages.
Lin et al, "Feature Pyramid Networks for Object Detection", Conference on Computer Vision and Pattern Recognition, Jul. 21-26, 2017, Honolulu, Hawaii, 9 pages.
Lin et al, "Microsoft COCO: Common Objects in Context", arXiv:1405v2, Jul. 5, 2014, 14 pages.
Luo et al, "Fast and Furious: Real Time End-to-End 3D Detection, Tracking and Motion Forecasting with a Single Convolutional Net", Conference on Computer Vision and Pattern Recognition, Jun. 18-23, 2018, Salt Lake City, Utah, 9 pages.
Qi et al, "Frustum PointNets for 3D Object Detection from RGB-D Data", arXiv:1711v2, Apr. 13, 2018, 15 pages.
Qi et al, "Pointnet: Deep Learning on Point Sets for 3D Classification and Segmentation", Conference on Computer Vision and Pattern Recognition, Jul. 21-26, 2017, Honolulu, Hawaii, 9 pages.
Qi et al, "Pointnet++: Deep Hierarchical Feature Learning on Point Sets in a Metric Space", Conference on Neural Information Processing Systems, Dec. 4-9, 2017, Long Beach, California, 10 pages.
Ren et al, "3D Object Detection with Latent Support Surfaces", Conference on Computer Vision and Pattern Recognition, Jun. 18-23, 2018, Salt Lake City, Utah, 9 pages.
Ren et al, "Accurate Single Stage Detector Using Recurrent Rolling Convolution", Conference on Computer Vision and Pattern Recognition, Jul. 21-26, 2017, Honolulu, Hawaii, 9 pages.
Ren et al, "Faster r-cnn: Towards Real-Time Object Detection with Region Proposal Networks", arXiv:15056v3, Jan. 6, 2016, 14 pages.
Ren et al, "SBNet: Sparse Blocks Network for fast Interference", arXiv:1801v2, Jun. 7, 2018, 10 pages.
Ren et al, "Three-Dimensional Object Detection and Layout Prediction Using Clouds of Oriented Gradients", Conference on Computer Vision and Pattern Recognition, Jun. 26-Jul. 1, 2016, Las Vegas, Nevada, 9 pages.
Ronneberger et al, "U-net: Convolutional Networks for Biomedical Image Segmentation", arXiv:1505v1, May 18, 2015, 8 pages.
Schwing et al, "Box in the box: Joint 3D Layout and Object Reasoning from Single Images", Conference on Computer Vision, Dec. 1-8, 2013, Sydney, Australia, 8 pages.
Shrivastava et al, "Training Region-Based Object Detectors with Online Hard Example Mining", arXiv:1604v1, Apr. 12, 2016, 9 pages.
Uhrig et al, "Sparsity Invariant CNNs", arXiv:1708v2, Aug. 30, 2017, 16 pages.
Wang et al, "Deep Parametric Continuous Convolutional Neural Networks", Conference on Computer Vision and Pattern Recognition, Jun. 18-23, 2018, Salt Lake City, Utah, 9 pages.
Wang et al, "Holistic 3D Scene Understanding from a Single Geo-Tagged Image", Conference on Computer Vision and Pattern Recognition, Jun. 7-12, 2015, Boston, Massachusetts, 9 pages.
Xu et al, "Multi-Level Fusion Based 3D Object Detection from Monocular Images", Conference on Computer Vision and Pattern Recognition, Jun. 18-23, 2018, Salt Lake City, Utah, 9 pages.
Yan et al, "SECOND: Sparsely Embedded Convolutional Detection", Sensor, vol. 18, No. 10, 2018, 17 pages.
Yang et al, "HDNET: Exploiting HD Maps for 3D Object Detection", Conference on Robot Learning, Oct. 30-Nov. 1, Zurich, Switzerland, 10 pages.
Yang et al, "PIXOR: Real-Time 3D Object Detection from Point Clouds", Conference on Computer Vision and Pattern Recognition, Jun. 18-23, 2018, Salt Lake City, Utah, 9 pages.
Zhang et al, "Led: Localization-Quality Estimation Embedded Detector", Conference on Image Processing, Oct. 7-10, 2018, Athens, Greece, 5 pages.
Zhou et al, "VoxelNet: End-to-End Learning for Point Cloud Based 3D Object Detection", arXiv:1711v1, Nov. 17, 2017, 10 pages.

* cited by examiner

MULTI-TASK MULTI-SENSOR FUSION FOR THREE-DIMENSIONAL OBJECT DETECTION

RELATED APPLICATIONS

This application is a continuation of U.S. application Ser. No. 16/654,487, filed Oct. 16, 2019. U.S. application Ser. No. 16/654,487 is hereby incorporated by reference herein in its entirety. U.S. application Ser. No. 16/654,487 claims priority to and the benefit of each of U.S. Provisional Patent Application No. 62/768,790, filed Nov. 16, 2018 and U.S. Provisional Patent Application No. 62/858,489, filed Jun. 7, 2019. Each of U.S. Provisional Patent Application No. 62/768,790 and U.S. Provisional Patent Application No. 62/858,489 are hereby incorporated by reference herein in their entireties.

FIELD

The present disclosure relates generally to detection of objects using sensors. In particular, the present disclosure is directed to systems and methods that perform multi-task and/or multi-sensor fusion for three-dimensional object detection in furtherance of, for example, autonomous vehicle perception and control.

BACKGROUND

An autonomous vehicle is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system configured to perform multi-task multi-sensor fusion for detecting objects. The computing system includes one or more processors and one or more non-transitory computer-readable media that collectively store: a machine-learned light detection and ranging (LIDAR) backbone model configured to receive a bird's eye view (BEV) representation of a LIDAR point cloud generated for an environment surrounding an autonomous vehicle and to process the BEV representation of the LIDAR point cloud to generate a LIDAR feature map; a machine-learned image backbone model configured to receive an image of the environment surrounding the autonomous vehicle and to process the image to generate an image feature map; a machine-learned refinement model configured to receive respective region of interest (ROI) feature crops from each of the LIDAR feature map and the image feature map, to perform ROI-wise fusion to fuse respective pairs of ROI feature crops to generate fused ROI feature crops, and to generate one or more object detections based on the fused ROI feature crops, wherein each of the one or more object detections indicates a location of a detected object within the environment surrounding the autonomous vehicle; and a machine-learned depth completion model configured to receive the image feature map generated by the machine-learned image backbone model and to produce a depth completion map. The machine-learned LIDAR backbone model, the machine-learned image backbone model, the machine-learned refinement model, and the machine-learned depth completion model have all been jointly trained end-to-end based on a total loss function that evaluates training object detections output by the machine-learned refinement model and training depth completion maps output by the machine-learned depth completion model during training.

Another example aspect of the present disclosure is directed to an autonomous vehicle that includes: at least one camera configured to capture an image of an environment surrounding the autonomous vehicle; a light detection and ranging (LIDAR) system configured to generate a LIDAR point cloud for the environment surrounding the autonomous vehicle; and a computing system. The computing system includes one or more processors; and one or more non-transitory computer-readable media that collectively store: a machine-learned mapping model configured to receive a LIDAR point cloud and to process the LIDAR point cloud to generate a ground geometry prediction that describes locations of a ground of the environment within the LIDAR point cloud; a machine-learned light detection and ranging (LIDAR) backbone model configured to receive a bird's eye view (BEV) representation of the LIDAR point cloud and to process the BEV representation of the LIDAR point cloud to generate a LIDAR feature map, the BEV representation of the LIDAR point cloud generated based at least in part on the ground geometry prediction output by the machine-learned mapping model; a machine-learned image backbone model configured to receive the image and to process the image to generate an image feature map; a machine-learned refinement model configured to receive respective region of interest (ROI) feature crops from each of the LIDAR feature map and the image feature map, to perform ROI-wise fusion to fuse respective pairs of ROI feature crops to generate fused ROI feature crops, and to generate one or more object detections based on the fused ROI feature crops, wherein each of the one or more object detections indicates a location of a detected object within the environment surrounding the autonomous vehicle. The machine-learned LIDAR backbone model, the machine-learned image backbone model, the machine-learned refinement model, and the machine-learned mapping model have all been jointly trained end-to-end based on a total loss function that evaluates the one or more object detections.

Another example aspect of the present disclosure is directed to an object detection system with both point-wise and region of interest (ROI)-wise feature fusion. The object detection system includes one or more processors and one or more non-transitory computer-readable media that collectively store: a machine-learned image backbone model configured to receive an image of an environment surrounding an autonomous vehicle and to process the image to generate an image feature map. The one or more non-transitory computer-readable media collectively store: a machine-learned light detection and ranging (LIDAR) backbone model configured to receive a bird's eye view (BEV) representation of a LIDAR point cloud generated for the environment surrounding the autonomous vehicle and to process the BEV representation of the LIDAR point cloud to generate a LIDAR feature map, wherein the machine-learned LIDAR backbone model comprises one or more point-wise fusion layers that are configured to: receive image feature data from one or more intermediate layers of the machine-learned image backbone model; and perform point-wise fusion to fuse the image feature data with one or more intermediate LIDAR feature maps generated by one or more intermediate layers of the machine-learned LIDAR backbone model. The one or more non-transitory computer-readable media collectively store: a machine-learned refinement model configured to receive respective ROI feature crops from each of the LIDAR feature map and the image feature map, to perform ROI-wise fusion to fuse respective pairs of ROI feature crops to generate fused ROI feature crops, and to generate one or more three-dimensional object detections based on the fused ROI feature crops, wherein each of the one or more three-dimensional object detections indicates a location of a detected object within the environment surrounding the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
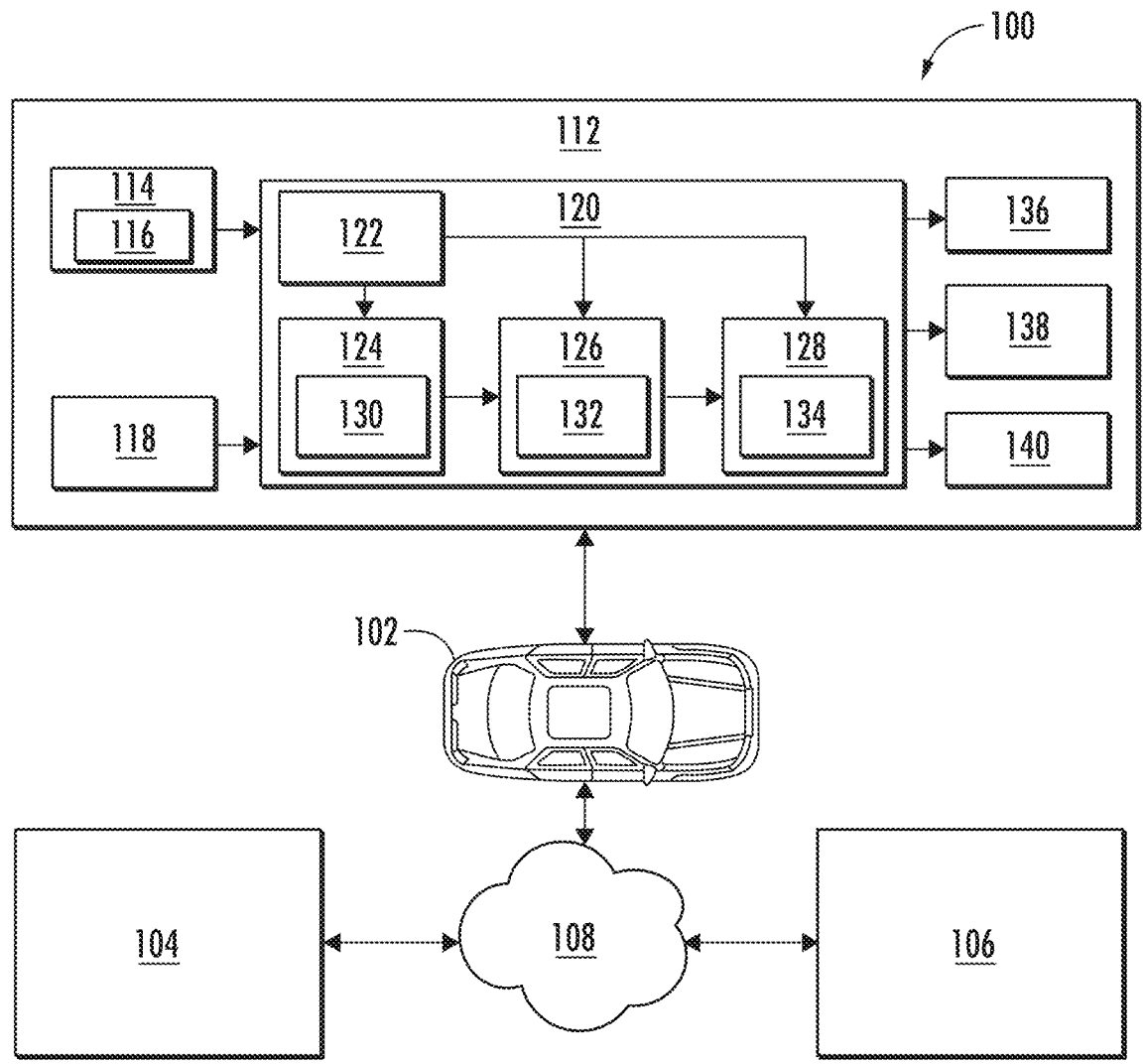
FIG. 1 depicts a block diagram of an example system for controlling the navigation of a vehicle according to example embodiments of the present disclosure.

Generally, the present disclosure is directed to systems and methods that perform multi-task and/or multi-sensor fusion for three-dimensional object detection in furtherance of, for example, autonomous vehicle perception and control. In particular, according to one aspect of the present disclosure, example systems and methods described herein exploit simultaneous training of a machine-learned model ensemble relative to multiple related tasks to learn to perform more accurate multi-sensor 3D object detection. For example, the present disclosure provides an end-to-end learnable architecture with multiple machine-learned models that interoperate to reason about 2D and/or 3D object detection as well as one or more auxiliary tasks such as ground estimation, depth completion, and/or other tasks. According to another aspect of the present disclosure, example systems and methods described herein can perform multi-sensor fusion (e.g., fusing features derived from image data, light detection and ranging (LIDAR) data, and/or other sensor modalities) at both the point-wise and region of interest (ROI)-wise level, resulting in fully fused feature representations. Thus, the present disclosure provides improved object detection systems, which may be used, for example, to identify objects in a surrounding environment of an autonomous vehicle, thereby enabling improved performance of the autonomous vehicle with regard to control, comfort, safety, fuel efficiency, and/or other metrics.

More particularly, recent research has attempted to tackle the problem of 3D object detection from monocular images, stereo cameras, or LIDAR point clouds. However, each sensor has its challenge: cameras have difficulty capturing fine-grained 3D information, while LIDAR provides very sparse observations at long range. Recently, several attempts have been developed to use information from multiple sensors. As an example, certain methods adopt a cascade approach by using cameras in the first stage and reasoning in LIDAR point clouds only at the second stage. However, such cascade approach suffers from the weakness of each single sensor. As a result, it is difficult to detect objects that are occluded or far away.

In response to these challenges, the present disclosure proposes that by jointly solving multiple different perception tasks, the proposed machine-learned models can learn better feature representations which result in better detection performance. This joint solving process may, in some instances, be referred to as multi-task learning. Towards this goal, the present disclosure provides a multi-sensor detector that reasons about a target task of 2D and/or 3D object detection in addition to one or more auxiliary tasks such as ground estimation, depth completion, and/or other tasks such as other vision tasks. Importantly, implementations of the proposed model can be learned end-to-end and can perform all these tasks at once.

According to another aspect of the present disclosure, this multi-task learning approach can be combined with a multi-sensor fusion architecture which receives as input sensor data collected from multiple sensors that operate according to different sensor modalities. As one example, an autonomous vehicle can include one or more cameras and a LIDAR system. The camera(s) can collect one or more images of an environment surrounding the autonomous vehicle while the LIDAR system can generate a three-dimensional point cloud for the environment (which will simply be referred to as a LIDAR point cloud). Other sensors can include radio detection and ranging (RADAR) sensors, ultrasound sensors, and/or the like.

More specifically, in one example, an object detection system (e.g., as included within the autonomous vehicle) can include a machine-learned LIDAR backbone model, a machine-learned image backbone model, and a machine-learned refinement model. The machine-learned LIDAR backbone model can be configured to receive a bird's eye view (BEV) representation of the LIDAR point cloud for the environment surrounding the autonomous vehicle. The machine-learned LIDAR backbone model can be configured to process the BEV representation of the LIDAR point cloud to generate a LIDAR feature map. The machine-learned image backbone model can be configured to receive the image(s) and to process the image(s) to generate an image feature map. The machine-learned refinement model can be configured to receive respective region of interest (ROI) feature crops from each of the LIDAR feature map and the image feature map, to perform ROI-wise fusion to fuse respective pairs of ROI feature crops to generate fused ROI feature crops, and to generate one or more three-dimensional object detections based on the fused ROI feature crops. Each of the one or more three-dimensional object detections can indicate a location of a detected object within the environment surrounding the autonomous vehicle. For example, the object detection(s) can be provided in the form of a three-dimensional bounding shape (e.g., bounding box). Thus, example implementations of the present disclosure can perform multi-sensor fusion at the ROI level.

As indicated above, in some implementations of the present disclosure, the above described model architecture can be simultaneously trained to solve multiple different, but related tasks. Thus, in some implementations, in addition to learning to produce the three-dimensional object detection(s) (which may be referred to as a "target task"), the model ensemble described above can further simultaneously or concurrently learn to perform one or more auxiliary tasks. In order to perform the simultaneous or concurrent learning from the multiple tasks, in some implementations, all of the models in the architecture can be jointly trained (e.g., in an end-to-end fashion) using a total loss function that includes multiple different loss function components, where each of the loss function components evaluates the architecture's performance on one of the multiple different tasks/objectives.

As one example, an auxiliary task can include generation of one or more two-dimensional object detections. Thus, while the three-dimensional object detection(s) describe the location(s) of detected object(s) in three-dimensional space (e.g., relative to the LIDAR point cloud and which may be projected onto the image in two-dimensions), the two-dimensional object detection(s) may describe the location(s) of detected object(s) in two-dimensional space (e.g., relative to the image). In some examples, the machine-learned refinement model can be configured to also produce the two-dimensional object detection(s) in addition to the three-dimensional object detection(s).

As another example auxiliary task, the object detection system can simultaneously learn to perform ground estimation. More specifically, in some implementations, in addition to the machine-learned models described above, the model architecture can further include a machine-learned mapping model. The machine-learned mapping model can be configured to receive the LIDAR point cloud and to process the LIDAR point cloud to generate a ground geometry prediction that describes locations of a ground of the environment within the LIDAR point cloud. As indicated above, the machine-learned mapping model can be jointly trained end-to-end with the other models included in the object detection system.

In some implementations, the BEV representation of the LIDAR point cloud that is provided as input to the LIDAR backbone model can be generated based on the ground geometry prediction. For example, the ground geometry prediction can provide a ground height value for each voxel of a raw BEV representation of the LIDAR point cloud. To produce the BEV representation of the LIDAR point cloud that is supplied as input to the LIDAR backbone model, the object detection system can subtract, from a height axis value of each point in the LIDAR point cloud, the respective ground height value associated with the respective voxel in which such point resides to produce a the BEV representation of the LIDAR point cloud (which may be referred to as a "ground-relative" BEV representation). In some implementations, the object detection system can add to a height axis value of each of the one or more three-dimensional object detections, the respective ground height values associated with the respective voxel in which such three-dimensional object detection resides, thereby returning the detections from ground-relative space to the original raw three-dimensional space.

Thus, in some implementations, the object detection system can estimate an accurate voxel-wise ground location online as one of its auxiliary tasks. This can in turn be used by the LIDAR backbone model to reason about relative location. Knowledge about the location of the ground can provide useful cues for 3D object detection in the context of self-driving vehicles, as the traffic participants of interest are restrained to this plane.

As another example auxiliary task, the object detection system can simultaneously learn to perform depth completion. More specifically, in some implementations, in addition to the machine-learned models described above, the model architecture can further include a machine-learned depth completion model. The depth completion model can be configured to receive the image feature map generated by the machine-learned image backbone model and to produce a depth completion map. For example, the depth completion map can describe a depth value for each pixel of the image. As indicated above, the machine-learned depth completion model can be jointly trained end-to-end with the other models included in the object detection system.

Exploiting the task of depth completion can assist in learning better cross-modality feature representation and more importantly, as is discussed further elsewhere herein, in achieving dense point-wise feature fusion with pseudo LIDAR points from dense depth. In particular, existing approaches which attempt to perform sensor fusion through projection of the LIDAR data suffer when the LIDAR points are sparse (e.g., the points within a certain region of the environment that is relatively distant from the LIDAR system). To address this issue, example implementations of the present disclosure use the machine-learned depth completion model to predict dense depth. The predicted depth can be used as pseudo-LIDAR points to find dense correspondences between multi-sensor feature maps.

According to another aspect of the present disclosure, example implementations of the proposed detection architecture perform both point-wise and ROI-wise feature fusion. In particular, in some implementations, the machine-learned LIDAR backbone model can include one or more point-wise fusion layers. The point-wise fusion layer(s) can be configured to receive image feature data from one or more intermediate layers of the machine-learned image backbone model and perform point-wise fusion to fuse the image feature data with one or more intermediate LIDAR feature maps generated by one or more intermediate layers of the machine-learned LIDAR backbone model. Thus, point-wise feature fusion can be applied to fuse multi-scale image features from the image stream to the BEV stream. In some implementations, as indicated above, the depth completion map generated by the machine-learned depth completion model can be used to assist in performing dense fusion.

Thus, aspects of the present disclosure are directed to a multi-task multi-sensor detection model that jointly reasons about 2D and 3D object detection, ground estimation, and/or depth completion. Point-wise and ROI-wise feature fusion can both be applied to achieve full multi-sensor fusion, while multi-task learning provides additional map prior and geometric clues enabling better representation learning and denser feature fusion.

The effectiveness of the proposed approach has been experimentally demonstrated. Example experimental results are contained in U.S. Provisional Patent Application No. 62/768,790, which is incorporated by reference in its entirety. In particular, example implementations of the present disclosure show, on multiple different benchmark datasets, very significant performance improvement over previous state-of-the-art approaches in 2D, 3D and BEV detection tasks. Meanwhile, an example implementation of the proposed detector runs over 10 frames per second, making it a practical solution for real-time application.

Thus, the systems and methods described herein may provide a number of technical effects and benefits. More particularly, the disclosed technology provides for improved detection of objects in three-dimensional space. Object detection and classification for autonomous vehicle applications can require a substantial amount of processing power and analytical precision to yield effective and accurate results. The disclosed technology employs object detection techniques that can provide substantial improvements to that end by employing fusion of multiple sensors and/or learning from multiple tasks simultaneously or concurrently. Object detection systems and methods incorporating such technology can be improved in a manner that yields more accurate and robust detection performance, thus yielding improved motion planning and navigation for autonomous vehicles.

Additional technical effects and advantages can be achieved by exploiting dynamic utilization of multiple sensor modalities. More particularly, an improved 3D object detection system can exploit both LIDAR systems and cameras to perform very accurate localization of objects within three-dimensional space relative to an autonomous vehicle. For example, multi-sensor fusion can be implemented via point-wise feature fusion (e.g., at different levels of resolution) and/or ROI-wise feature fusion. Because LIDAR point cloud data can sometimes be sparse and continuous, while cameras capture dense features at discrete states, fusing such sensor data is non-trivial. The disclosed deep fusion offers a technical solution that reduces resolution loss relative to the original sensor data streams.

Additional technical effects and benefits can be achieved by implementing data transformations and object detection using a bird's eye view (BEV) representation of the data (e.g., sensor data, map data, etc.). BEV representations of sensor data can be more amenable to efficient inference using machine-learned detector models. In addition, BEV representations of sensor data can advantageously retain the metric space associated with raw sensor data (e.g., image data captured by cameras and/or LIDAR point cloud data captured by a LIDAR system).

Additional technical effects and advantages are achieved by utilizing machine-learned model(s) for one or more systems within an object detection system. For example, a machine-learned mapping model can help determine ground elevation data when it may be unavailable from sources such as a high definition map database. Likewise, a machine-learned depth completion model can help determine additional depth information when it may be unavailable from the raw LIDAR point cloud. Additionally or alternatively, additional machine-learned models can be included within a fusion system for implementing sensor fusion. Additionally or alternatively, a machine-learned refinement model can be included to perform object detection of ROI-fused sensor data and/or feature maps generated via deep sensor fusion techniques.

The utilization of one or more machine-learned models can yield more effective performance in comparison to other approaches including rules-based determination systems. In addition, machine-learned models incorporated within an object detection system can improve scalability and can greatly reduce the research time needed relative to development of hand-crafted rules. For example, for manually created (e.g., rules conceived and written by one or more people) object detection rules, a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the improved object detection features disclosed herein lead to improved safety for passengers and/or cargo in autonomous vehicles and to pedestrians and other vehicles. Further, the disclosed technology can achieve improved fuel economy by requiring less sudden braking and other energy inefficient maneuvers caused by inaccurate or imprecise detection of objects within the environment surrounding an autonomous vehicle. Additionally, the disclosed technology can result in more efficient utilization of computational resources due to the improvements in processing data and implementing object detection that come through use of one or more of the disclosed techniques.

The disclosed technology can also improve the operational performance and safety of an autonomous vehicle by reducing the amount of wear and tear on vehicle components through more gradual braking based on earlier and more accurate detection of objects of interest (e.g., especially objects at a significant distance which, absent the depth completion techniques described herein, may not be detected based on the raw LIDAR data). For example, more effective detection of objects of interest by the vehicle computing system can allow for a smoother ride that reduces the amount of strain on the vehicle's engine, braking, and/or steering systems, thereby improving vehicle performance and safety.

With reference now to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, a bike, a scooter and/or another type of vehicle or light electric vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
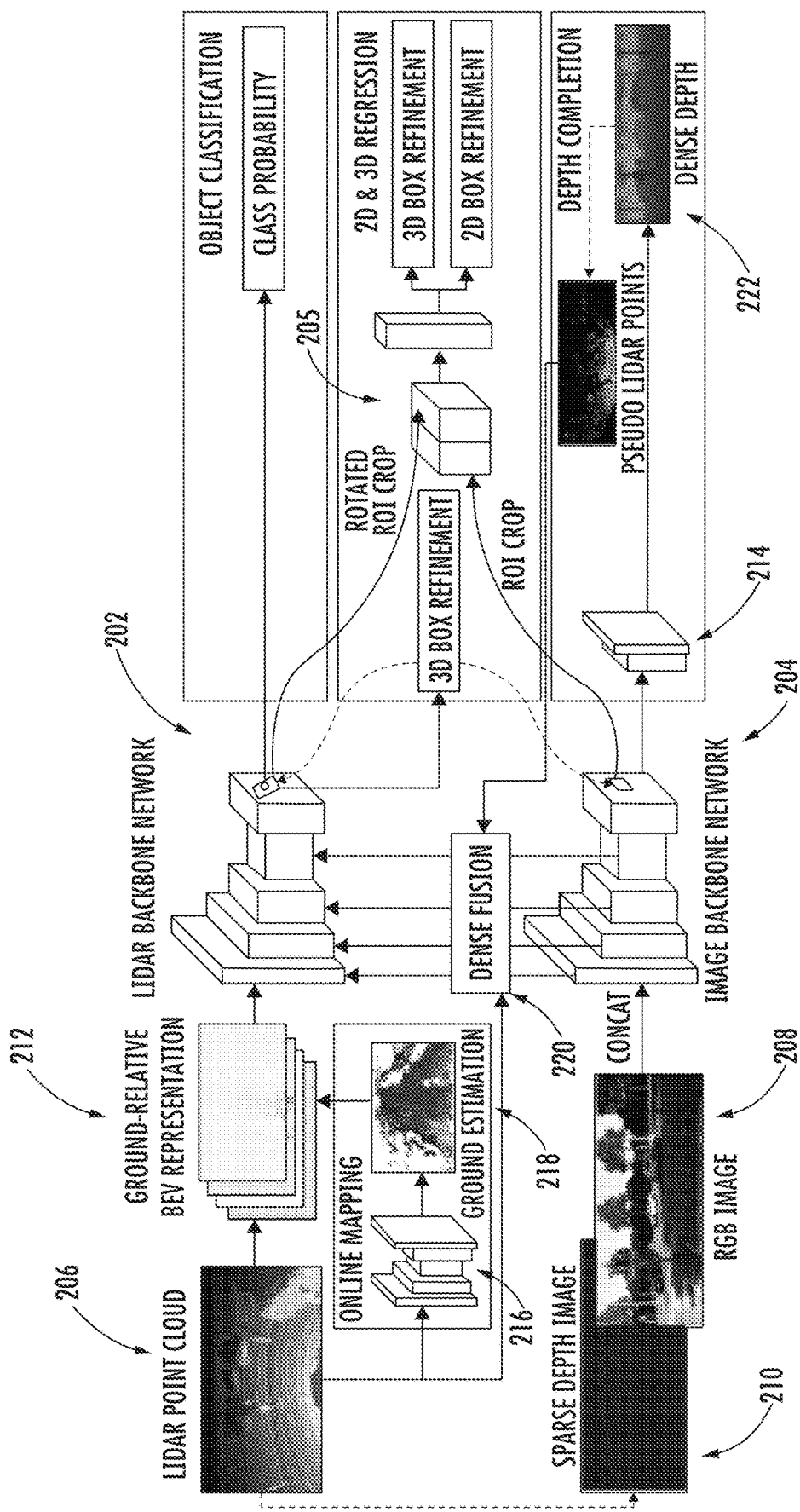
FIG. 2 depicts a graphical diagram of an example object detection architecture according to example embodiments of the present disclosure.

Referring still to FIG. 1, vehicle computing system 112 of FIG. 1 can be configured to receive output(s) from an object detection system, such as, for example, the system illustrated in FIG. 2. For example, output(s) can be provided to one or more of the perception system 124, prediction system 126, motion planning system 128, and vehicle control system 138 to implement additional autonomy processing functionality based on the output(s). For example, motion planning system 128 of FIG. 1 can determine a motion plan for the autonomous vehicle (e.g., vehicle 102) based at least in part on the output(s) of the system illustrated in FIG. 2. Stated differently, given information about the current locations of objects detected via the output(s) and/or predicted future locations and/or moving paths of proximate objects detected via the output(s), the motion planning system 128 can determine a motion plan for the autonomous vehicle (e.g., vehicle 102) that best navigates the autonomous vehicle (e.g., vehicle 102) along a determined travel route relative to the objects at such locations. The motion planning system 128 then can provide the selected motion plan to a vehicle control system 138 that controls one or more vehicle controls (e.g., actuators or other devices that control gas flow, steering, braking, etc.) to execute the selected motion plan.

FIG. 2 depicts a graphical diagram of an example object detection system architecture according to example embodiments of the present disclosure. In particular, FIG. 2 illustrates one example architecture of a multi-task multi-sensor fusion model for 2D and 3D object detection. Dashed arrows denote projection, while solid arrows denote data flow. The illustrated system is a two-stage detector with densely fused two-stream multi-sensor backbone models. In the illustrated example, the first stage is a single-shot detector that outputs a small number of high-quality 3D detections. The second stage applies ROI feature fusion for more precise 2D and 3D box regression. Ground estimation is explored to incorporate geometric ground prior to the LIDAR point cloud. Depth completion is exploited to learn better cross-modality feature representation and achieve dense feature map fusion by transforming predicted dense depth image into dense pseudo LIDAR points. The whole model ensemble can be learned end-to-end. As one example, the object detection system illustrated in FIG. 2 can be included in the perception system 124 illustrated in FIG. 1.

More particularly, one of the fundamental tasks in autonomous driving is to perceive the scene in real-time. FIG. 2 illustrates an example multi-task multi-sensor fusion model for the task of 3D object detection. The example proposed approach has the following highlights. First, a multi-sensor architecture is used that combines point-wise and ROI-wise feature fusion. Second, an integrated ground estimation module reasons about the geometry of the road. Third, the task of depth completion is exploited to learn better multi-sensor features and achieve dense point-wise feature fusion. As a result, the whole model can be learned end-to-end by exploiting a multi-task loss.

Referring more specifically to FIG. 2, the object detection architecture can include a machine-learned LIDAR backbone model 202, a machine-learned image backbone model 204, and a machine-learned refinement model 205. The machine-learned LIDAR backbone model 202 can be configured to receive a bird's eye view (BEV) representation 212 of a LIDAR point cloud 206 for the environment surrounding the autonomous vehicle. The machine-learned LIDAR backbone model 202 can be configured to process the BEV representation 212 of the LIDAR point cloud 206 to generate a LIDAR feature map. The machine-learned image backbone model 204 can be configured to receive image(s) 208 and to process the image(s) 208 to generate an image feature map.

The machine-learned refinement model 205 can be configured to receive respective region of interest (ROI) feature crops from each of the LIDAR feature map and the image feature map, to perform ROI-wise fusion to fuse respective pairs of ROI feature crops to generate fused ROI feature crops, and to generate one or more three-dimensional object detections based on the fused ROI feature crops. Each of the one or more three-dimensional object detections can indicate a location of a detected object within the environment surrounding the autonomous vehicle. For example, the object detection(s) can be provided in the form of a three-dimensional bounding shape (e.g., bounding box). Thus, example implementations of the present disclosure can perform multi-sensor fusion at the ROI level.

The illustrated multi-sensor detector can take a LIDAR point cloud 206 and an RGB image 208 as input. The backbone models 202 and 204 form a two-stream structure, where one stream extracts image feature maps, and the other extracts LIDAR BEV feature maps. Point-wise feature fusion 220 can be applied to fuse multiscale image features to BEV stream. The final BEV feature map predicts, in some implementations, dense 3D detections per BEV voxel via 2D convolution. In some implementations, after Non-Maximum Suppression (NMS) and score thresholding, the output of the system can be a small number of high-quality 3D detections and their projected 2D detections. In some implementations, a 2D and 3D box refinement by ROI-wise feature fusion can be applied, where features from both image ROIs and BEV oriented ROIs are combined. After the refinement, the system can output accurate 2D and 3D detections.

In various implementations, different input representations can be used. In some implementations, a voxel based LIDAR representation can be used due to its efficiency. In particular, in some implementations, the point cloud 206 can be voxelized into a 3D occupancy grid, where the voxel feature is computed via 8-point linear interpolation on each LIDAR point. This LIDAR representation is able to capture fine-grained point density clues efficiently. The resulting 3D volume can be considered as a BEV representation by treating the height slices as feature channels. This allows reasoning within 2D BEV space, which brings significant efficiency gain with no performance drop. In some implementations, the RGB image 208 can be used as input for the camera stream. When the auxiliary task of depth completion is exploited, the input can optionally additionally include a sparse depth image 210 generated by projecting the LIDAR points 206 to the image 208.

Various different network architectures can be used. As one example, the backbone models 202 and 204 can follow a two-stream architecture to process multi-sensor data. Specifically, for the image backbone model 204, in some implementations, a pre-trained ResNet-18 can be used until the fourth convolutional block. Each block can contain 2 residual layers with number of feature maps increasing from 64 to 512 linearly. In some implementations, for the LIDAR backbone model 202, a customized residual network can be used which is deeper and thinner than ResNet-18 for a better trade-off between speed and accuracy. In particular, one example has four residual blocks with 2, 4, 6, 6 residual layers in each, and the numbers of feature maps are 64, 128, 192 and 256. The max pooling layer before the first residual block can be removed to maintain more details in the point cloud feature.

In some implementations, in both streams, a feature pyramid network (FPN) can apply 1×1 convolution and bilinear up-sampling to combine multi-scale features. As a result, the final feature maps of the two streams have a down-sampling factor of 4 compared with the input.

In some implementations, on top of the last BEV feature map, the architecture can include a 1×1 convolution to perform dense 3D object detection.

In some implementations, after score thresholding and oriented NMS, a small number of high-quality 3D detections are projected to both BEV space and 2D image space, and their ROI features are cropped from each stream's last feature map via precise ROI feature extraction. In some implementations, the multi-sensor ROI features can be fused together and fed into the refinement model 205 with, as an example, two 256-dimension fully connected layers to predict the 2D and 3D box refinements for each 3D detection respectively.

As indicated above, in some implementations of the present disclosure, the above described model architecture can be simultaneously trained to solve multiple different, but related tasks. Thus, in some implementations, in addition to learning to produce the three-dimensional object detection(s) (which may be referred to as a "target task"), the model ensemble illustrated in FIG. 2 can further simultaneously or concurrently learn to perform one or more auxiliary tasks. In order to perform the simultaneous or concurrent learning from the multiple tasks, in some implementations, all of the models in the illustrated architecture can be jointly trained (e.g., in an end-to-end fashion) using a total loss function that includes multiple different loss function components, where each of the loss function components evaluates the architecture's performance on one of the multiple different tasks/objectives.

As one example, an auxiliary task can include generation of one or more two-dimensional object detections. Thus, while the three-dimensional object detection(s) describe the location(s) of detected object(s) in three-dimensional space (e.g., relative to the LIDAR point cloud and which may be projected onto the image in two-dimensions), the two-dimensional object detection(s) may describe the location(s) of detected object(s) in two-dimensional space (e.g., relative to the image). In some examples, the machine-learned refinement model 205 can be configured to also produce the two-dimensional object detection(s) in addition to the three-dimensional object detection(s).

As another example auxiliary task, the object detection system can simultaneously learn to perform ground estimation. More specifically, in some implementations, in addition to the machine-learned models described above, the model architecture can further include a machine-learned mapping model 216. The machine-learned mapping model 216 can be configured to receive the LIDAR point cloud 206 and to process the LIDAR point cloud 206 to generate a ground geometry prediction 218 that describes locations of a ground of the environment within the LIDAR point cloud 206. As indicated above, the machine-learned mapping model 216 can be jointly trained end-to-end with the other models included in the object detection system.

In some implementations, the BEV representation 212 of the LIDAR point cloud 206 that is provided as input to the LIDAR backbone model 202 can be generated based on the ground geometry prediction 218. For example, the ground geometry prediction 218 can provide a ground height value for each voxel of a raw BEV representation of the LIDAR point cloud 206. To produce the BEV representation 212 of the LIDAR point cloud 206 that is supplied as input to the LIDAR backbone model 202, the object detection system can subtract, from a height axis value of each point in the LIDAR point cloud, the respective ground height value associated with the respective voxel in which such point resides to produce a the BEV representation 212 of the LIDAR point cloud 206 (which may be referred to as a "ground-relative" BEV representation 212). In some implementations, the object detection system can add to a height axis value of each of the one or more three-dimensional object detections, the respective ground height values associated with the respective voxel in which such three-dimensional object detection resides, thereby returning the detections from ground-relative space to the original raw three-dimensional space.

Thus, in some implementations, the object detection system illustrated in FIG. 2 can estimate an accurate voxel-wise ground location online as one of its auxiliary tasks. This can in turn be used by the LIDAR backbone model 202 to reason about relative location. Knowledge about the location of the ground can provide useful cues for 3D object detection in the context of self-driving vehicles, as the traffic participants of interest are restrained to this plane.

More particularly, mapping is an important task for autonomous driving, and in most cases the map building process is done offline. However, online mapping is appealing for that it decreases the system's dependency on offline built maps and increases the system's robustness.

As such, some example implementations of the present disclosure focus on one specific subtask in mapping, which is to estimate the road geometry on-the-fly from a single LIDAR sweep. This task can be formulated as a regression problem, where the ground height value is estimated for each voxel in the BEV space. This formulation is more accurate than plane based parametrization, as in practice the road is often curved especially when we look far ahead.

One example network architecture for the machine-learned mapping model 216 can include a small fully convolutional U-Net on top of the LIDAR BEV representation to estimate the normalized voxel-wise ground heights at an inference time of 8 millisecond. The U-Net architecture outputs prediction at the same resolution as the input, and is good at capturing global context while maintaining low-level details.

One example map fusion process is as follows: Given a voxel-wise ground estimation, point-wise ground height can first be extracted by looking for the point index during voxelization. The ground height can then be subtracted from each LIDAR point's Z axis value to generate a new LIDAR BEV representation 212 (relative to ground), which is fed to the LIDAR backbone model 202. In the regression part of the 3D detection, the ground height can be added back to the predicted Z term. Online ground estimation eases 3D object localization as traffic participants of interest all lay on the ground.

As another example auxiliary task, the object detection system can simultaneously learn to perform depth completion. More specifically, in some implementations, in addition to the machine-learned models described above, the model architecture can further include a machine-learned depth completion model 214. The depth completion model 214 can be configured to receive the image feature map generated by the machine-learned image backbone model 204 and to produce a depth completion map 222. For example, the depth completion map 222 can describe a depth value for each pixel of the image 208. As indicated above, the machine-learned depth completion model 214 can be jointly trained end-to-end with the other models included in the object detection system.

More particularly, LIDAR provides long range 3D information for accurate 3D object detection. However, the observation is sparse especially at long range. The present disclosure proposes to densify LIDAR points by depth completion from both sparse LIDAR observation and RGB image.

Specifically, given the projected (into the image plane) sparse depth 210 from the LIDAR point cloud 206 and a camera image 208, the models 204 and 214 cooperate to output dense depth 222 at the same resolution as the input image 208.

In particular, in some implementations, a three-channel sparse depth image 210 can be generated from the LIDAR point cloud 206, representing the sub-pixel offsets and the depth value. As one example, each LIDAR point (x; y; z) can be projected to the camera space, denoted as ($x_{cam}$; $y_{cam}$; $z_{cam}$) (the Z axis points to the front of the camera), where $z_{cam}$ is the depth of the LIDAR point in camera space. The point can then be projected from camera space to image space, denoted as ($x_{im}$; $y_{im}$). The pixel (u; v) closest to ($x_{im}$; $y_{im}$) can be identified and ($x_{im}$-u; $y_{im}$-v; $z_{cam}$/10) can be computed as the value of pixel (u; v) on the sparse depth image 210. The division by 10 can optionally be done for normalization purposes. For pixel locations with no LIDAR point, the pixel value can be set to zero. The resulting sparse depth image 210 can then be concatenated with the RGB image 208 and fed to the image backbone model 204.

One example architecture for the depth completion model 214 shares the feature representation with the image backbone model 204, and applies four convolutional layers accompanied with two bilinear up-sampling layers afterwards to predict the dense pixel-wise depth 222 at the same resolution as the input image 208.

In some implementations, the dense depth 222 can be used for dense point-wise feature fusion 220. In particular, the point-wise feature fusion relies on LIDAR points to find the correspondence between multi-sensor feature maps. However, since LIDAR observation is sparse by nature, the point-wise feature fusion is sparse.

In contrast, the depth completion task provides dense depth estimation per image pixel, and therefore can be used as "pseudo" LIDAR points to find dense pixel correspondence between multi-sensor feature maps. In practice, some implementations use both true and pseudo LIDAR points together in fusion and resort to pseudo points only when true points are not available.

According to another aspect of the present disclosure, example implementations of the proposed detection architecture perform both point-wise fusion 220 and ROI-wise feature fusion. In particular, in some implementations, the machine-learned LIDAR backbone model 202 can include one or more point-wise fusion layers 220. The point-wise fusion layer(s) 220 can be configured to receive image feature data from one or more intermediate layers of the machine-learned image backbone model 204 and perform point-wise fusion to fuse the image feature data with one or more intermediate LIDAR feature maps generated by one or more intermediate layers of the machine-learned LIDAR backbone model 202. Thus, point-wise feature fusion 220 can be applied to fuse multi-scale image features from the image stream to the BEV stream. In some implementations, as indicated above, the depth completion map 222 generated by the machine-learned depth completion model 214 can be used to assist in performing dense fusion.

Figure 3:
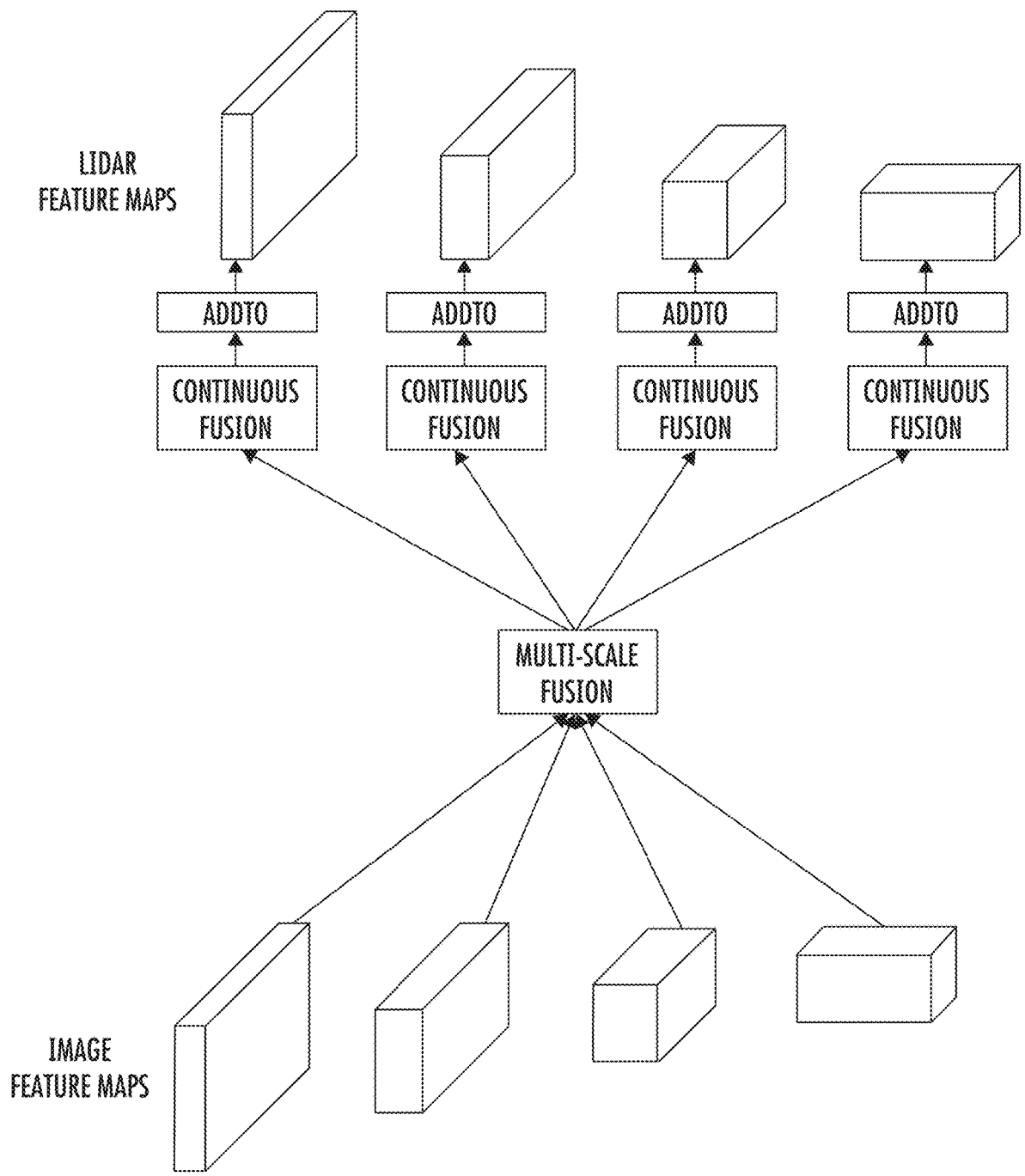
FIG. 3 depicts a graphical diagram of example feature fusion layers according to example embodiments of the present disclosure.

FIG. 3 depicts one example visualization of point-wise feature fusion between LIDAR and image backbone networks. A feature pyramid network can be used to combine multi-scale image feature maps, followed with a continuous fusion layer to project image feature map into BEV space. Feature fusion can be implemented by element-wise summation.

More specifically, point-wise feature fusion can be applied between the convolutional feature maps of LIDAR and image backbone models. The fusion can be directed from image steam to LIDAR steam to augment BEV features with information richness of image features and vice versa. For example, multi-scale features can be gathered from all four blocks in the image backbone network with a feature pyramid network. The resulting multi-scale image feature map can then be fused to each block of the LIDAR BEV backbone network.

To fuse image feature map with BEV feature map, the pixel-wise correspondence between the two sensors can be identified. Some example implementations can use LIDAR points to establish dense and accurate correspondence between the image and BEV feature maps. For each pixel in the BEV feature map, its nearest LIDAR point can be identified and projected onto the image feature map to retrieve the corresponding image feature. The distance between the BEV pixel and LIDAR point can be computed as the geometric feature. Both retrieved image feature and the BEV geometric feature can be passed into a Multi-Layer Perceptron (MLP) and the output can be fused to BEV feature map by element-wise addition. Note that such point-wise feature fusion is sparse by nature of LIDAR observation.

Figure 4:
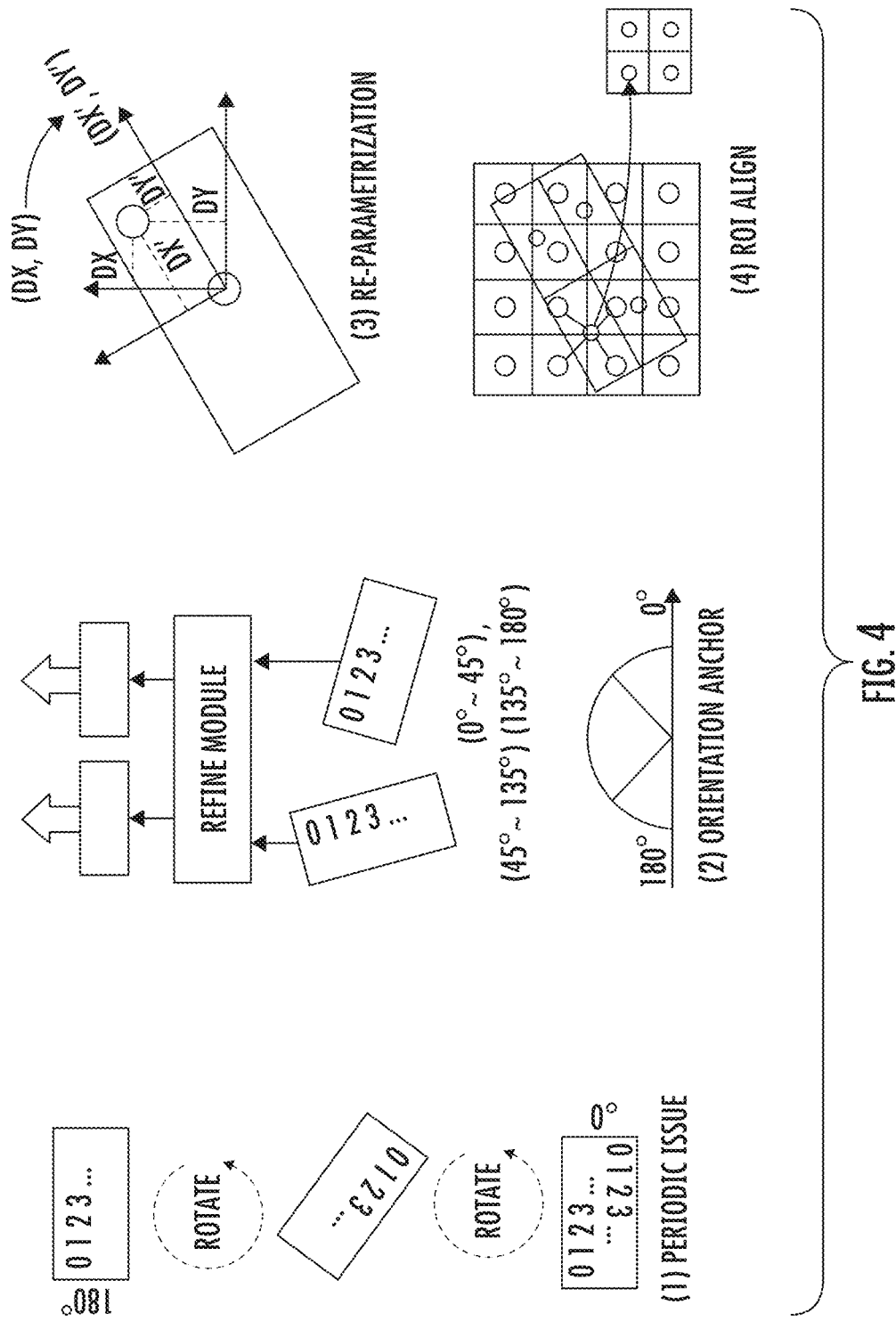
FIG. 4 depicts a graphical diagram of an example ROI feature fusion process according to example embodiments of the present disclosure.

FIG. 4 depicts precise rotated ROI feature extraction that takes orientation cycle into account. In particular, FIG. 4 illustrates, at (1), the rotational periodicity causes reverse of order in feature extraction and at (2), an ROI refine module with two orientation anchors. In some implementations, an ROI can be assigned to 0 or 90 degrees. They share most refining layers except for the output. At (3), FIG. 4 depicts the regression target of relative offsets are re-parametrized with respect to the object orientation axes and at (4) a n×n sized feature is extracted using bilinear interpolation (an example is shown with n=2).

More particularly, one example motivation of the ROI-wise feature fusion is to further refine the localization precision of the high-quality detections in 2D and 3D spaces respectively.

Towards this goal, the ROI feature extraction itself should be precise so as to properly predict the relative box refinement. By projecting a 3D detection onto the image and BEV feature maps, we get an axis-aligned image ROI and an oriented BEV ROI. Some example implementations can use ROIAlign to extract features from an axis-aligned image ROI.

For oriented BEV ROI feature extraction, however, two new issues (as shown in FIG. 4) are observed and resolved. First, the periodicity of the ROI orientation causes the reverse of feature order around the cycle boundary. To solve this issue, the present disclosure proposes an oriented ROI feature extraction module with anchors. Given an oriented ROI, it can first be assigned to one of the two orientation anchors, 0 or 90 degrees. Each anchor has a consistent feature extraction order. The two anchors share the refinement net except for the output layer.

Second, when the ROI is rotated, its location offset can be parametrized in the rotated coordinates as well. In practice, the axis-aligned location offset can be rotated to be aligned with the ROI orientation axes. Similar to ROIAlign, some implementations of the present disclosure extract bilinear interpolated feature into a n×n regular grid for the BEV ROI (on example is n=5).

Referring again to FIG. 2, the illustrated ensemble of models can, in some implementations, be trained jointly and end-to-end. In particular, a multi-task loss can be employed to train the multi-sensor detector end-to-end. In some implementations, the full model ensemble outputs object classification, 3D box estimation, 2D and 3D box refinement, ground estimation and dense depth. During training, detection labels and dense depth labels may be available, while ground estimation can be optimized implicitly by the 3D localization loss. There are two paths of gradient transmission for ground estimation. One is from the 3D box output where ground height is added back to predicted Z term. The other goes through the LIDAR backbone model 202 to the LIDAR voxelization layer where ground height is subtracted from the Z coordinate of each LIDAR point.

As examples, for object classification loss $L_{cls}$, binary cross entropy can be used. For 3D box estimation loss $L_{box}$ and 3D box refinement loss $L_{r3d}$, the system can compute smooth l1 loss on each dimension of the 3D object (x; y; z; log(w); log(l); log(h); θ), and sum over positive samples. For 2D box refinement loss $L_{r2d}$, the system can similarly compute smooth l1 loss on each dimension of the 2D object (x; y; log(w); log(h)), and sum over positive samples. For dense depth prediction loss $L_{depth}$, the system can sum l1 loss over all pixels. One example total loss can be defined as follows:

$$\text{Loss} = L_{cls} + \lambda(L_{box} + L_{r2d} + L_{r3d}) + \gamma L_{depth}$$

where λ and γ are the weights to balance different tasks.

A good initialization can assist in faster convergence. Some example implementations use the pre-trained ResNet-18 network to initialize the image backbone model 204. For the additional channels of the sparse depth image 210 at the input, the corresponding weights can be set to zero. The ground estimation model 218 can optionally be pretrained on TOR4D dataset with offline maps as labels and l2 loss as objective function. Other models can be initialized randomly. The architecture can be trained, for example, with stochastic gradient descent using Adam optimizer.

Figure 5:
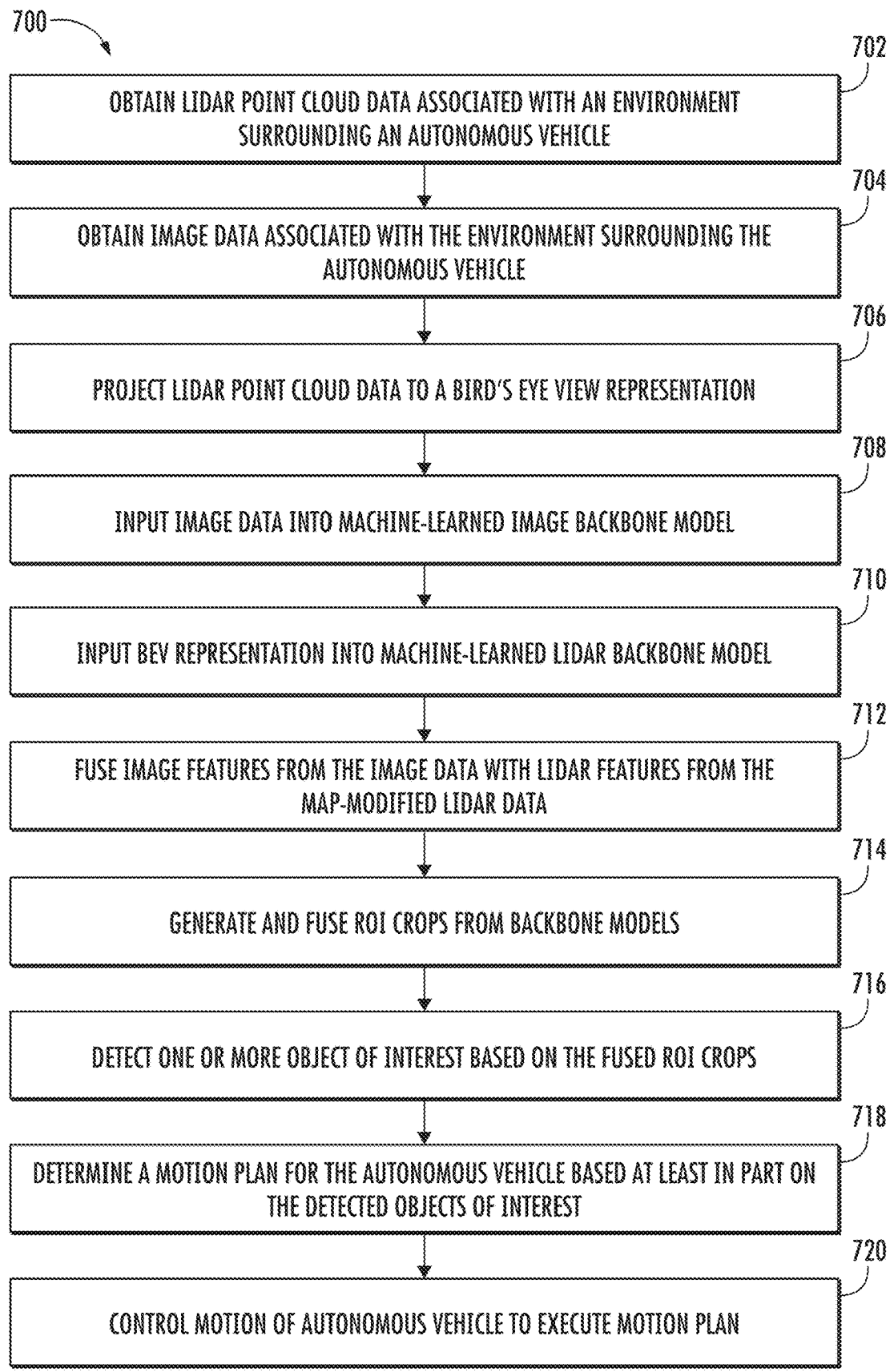
FIG. 5 depicts a flow chart diagram of an example method to perform object detection according to example embodiments of the present disclosure.

FIG. 5 depicts a flowchart diagram of an example object detection method 700 according to example embodiments of the present disclosure. One or more portion(s) of the method 700 can be implemented by one or more computing devices such as, for example, the computing device(s) within vehicle computing system 112 of FIG. 1 or a remote computing system.

Referring more particularly to FIG. 5, a computing system including one or more computing devices can implement one or more steps of method 700. At 702, method 700 can include obtaining/receiving LIDAR point cloud data associated with an environment surrounding an autonomous vehicle. In some implementations, the LIDAR point cloud data obtained at 702 can correspond to sensor data 116 of FIG. 1. In some implementations, the LIDAR point cloud data obtained at 702 can include a projected bird's eye view representation of LIDAR data obtained relative to an autonomous vehicle.

At 704, method 700 can include obtaining/receiving image data associated with the environment surrounding an autonomous vehicle. In some implementations, the image data obtained at 704 can correspond to sensor data 116 of FIG. 1.

At 706, the method 700 can include projecting the LIDAR point cloud data obtained at 702 to a bird's eye view representation.

At 708, method 700 can include inputting the image data into a machine-learned image backbone model. At 710, method 700 can inputting the BEV representation into a machine-learned LIDAR backbone model At 712, method 700 can include fusing image features from image data (e.g., image data obtained at 704) with LIDAR features from the BEV representation of the LIDAR data. In some implementations, fusing at 712 can include executing one or more continuous convolutions to fuse image features from a first data stream with LIDAR features from a second data stream. In some implementations, executing one or more continuous convolutions as part of fusing at 712 can be implemented as part of a machine-learned sensor fusion model or sensor fusion layers.

At 714, method 700 can include generating a feature map comprising the fused image features and LIDAR features determined at 712.

At 716, method 700 can include detecting three-dimensional objects of interest based on the fused ROI crops generated at 714. In some implementations, detecting objects of interest at 716 can include providing the feature map generated at 714 as input to a machine-learned refinement model. In response to receiving the feature map, the machine-learned refinement model can be trained to generate as output a plurality of detections corresponding to identified objects of interest within the feature map. In some implementations, detecting objects of interest at 716 can include determining a plurality of object classifications and/or bounding shapes corresponding to the detected objects of interest. For example, in one implementation, the plurality of objects detected at 716 can include a plurality of bounding shapes at locations within the feature map(s) having a confidence score associated with an object likelihood that is above a threshold value. In some implementations, detecting objects of interest at 716 can include determining one or more of a classification indicative of a likelihood that each of the one or more objects of interest comprises a class of object from a predefined group of object classes (e.g., vehicle, bicycle, pedestrian, etc.) and a bounding shape representative of a size, a location, and an orientation of each the one or more objects of interest.

At 718, method 700 can include determining a motion plan based on the object detections determined by the machine-learned detector model at 716. In some implementations, determining a motion plan at 718 can be implemented by motion planning system 128 of FIG. 1.

At 720, method 700 can include controlling motion of an autonomous vehicle (e.g., vehicle 102 of FIG. 1) based at least in part on the motion plan determined at 718. In some implementations, controlling motion of an autonomous vehicle can be implemented by vehicle control system 138 of FIG. 1.

Although FIG. 5 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

Figure 6:
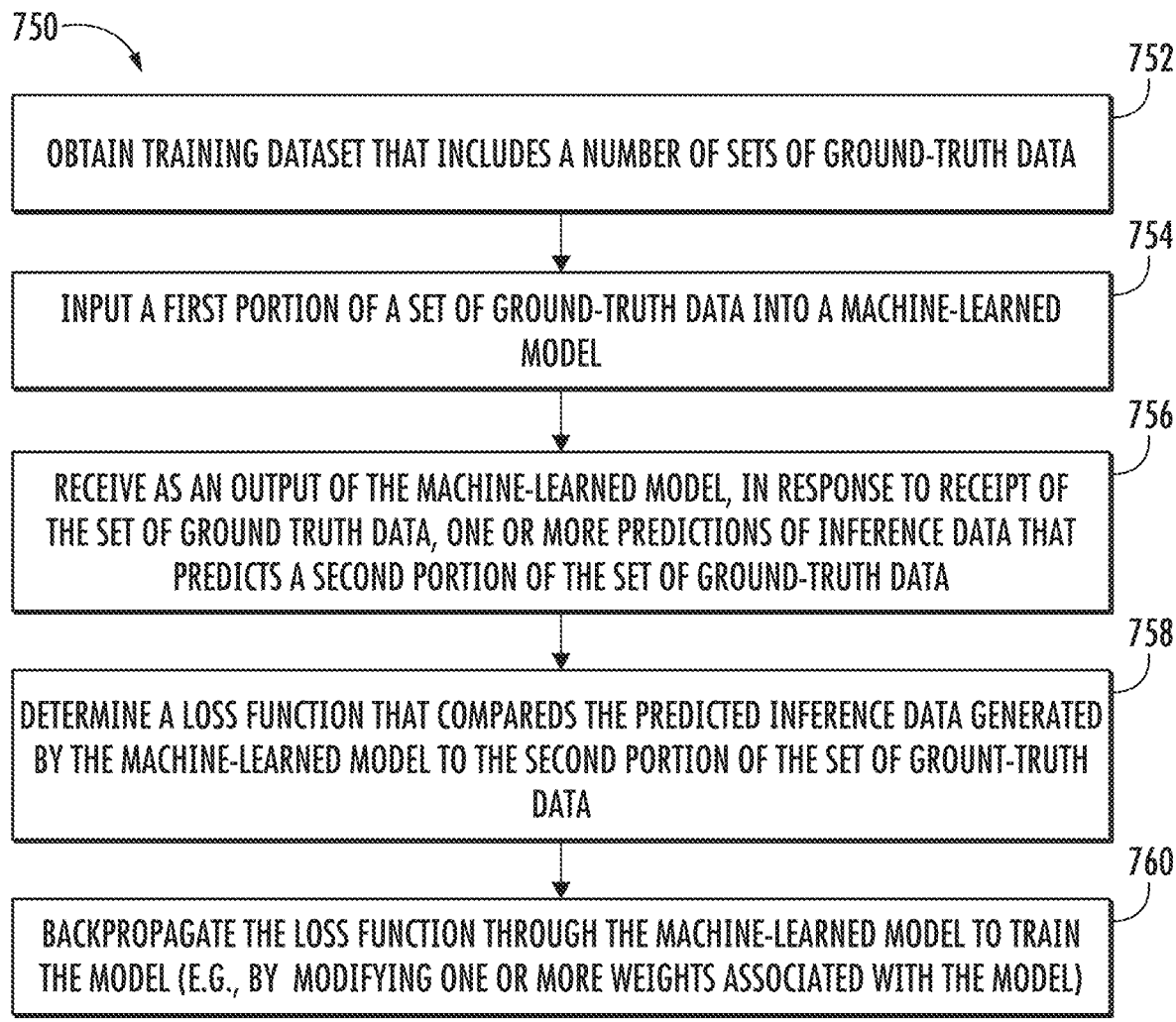
FIG. 6 depicts a flow chart diagram of an example method to train machine-learned models according to example embodiments of the present disclosure.

FIG. 6 depicts a flowchart diagram of an example machine learning method 750 according to example embodiments of the present disclosure. One or more portion(s) of the model training method 750 can be implemented by one or more computing devices such as, for example, the computing device(s) within vehicle computing system 112 of FIG. 1 or a remote computing system. Moreover, one or more portion(s) of the model training method 750 can be implemented as an algorithm on the hardware components of the device(s) described herein to, for example, determine object intention and associated motion planning for an autonomous vehicle. The model training method of FIG. 6 can be used to train one or more of the machine-learned models described herein, including but not limited to machine-learned model(s) illustrated in FIG. 2.

Referring more particularly to FIG. 6, a computing system including one or more computing devices can implement one or more steps of method 750. At 752, method 750 can involve one or more computing devices included within a computing system obtaining a training dataset that includes a number of sets of ground-truth data. For example, to train a machine-learned model, a training dataset can be obtained that includes a large number of previously obtained representations of input data as well as corresponding labels that describe corresponding outputs associated with the corresponding input data. A training dataset can more particularly include a first portion of data corresponding to one or more representations of input data. The input data can, for example, be recorded or otherwise determined while a vehicle is in navigational operation and/or the like. The training dataset can further include a second portion of data corresponding to labels identifying outputs. The labels included within the second portion of data within the training dataset can be manually annotated, automatically annotated, or annotated using a combination of automatic labeling and manual labeling.

At 754, the computing system can input a first portion of a set of ground-truth data into a machine-learned model. For example, to train the model, a training computing system can input a first portion of a set of ground-truth data (e.g., the first portion of the training dataset) into the machine-learned model to be trained.

At 756, the computing system can receive as output of the machine-learned model, in response to receipt of the ground-truth data, one or more inferences that predict a second portion of the set of ground-truth data. For example, in response to receipt of a first portion of a set of ground-truth data, the machine-learned model can output inferences. This output of the machine-learned model can predict the remainder of the set of ground-truth data (e.g., the second portion of the training dataset).

At 758, the computing system can determine a loss function that compares the predicted inferences generated by the machine-learned model to the second portion of the set of ground-truth data. For example, after receiving such predictions, a training computing system can apply or otherwise determine a loss function that compares the inferences output by the machine-learned model to the remainder of the ground-truth data (e.g., ground-truth labels) which the model attempted to predict.

At 760, the computing system can backpropagate the loss function through the machine-learned model to train the model (e.g., by modifying one or more weights associated with the model). This process of inputting ground-truth data, determining a loss function, and backpropagating the loss function through the model can be repeated numerous times as part of training the model. For example, the process can be repeated for each of numerous sets of ground-truth data provided within the training dataset.

Figure 7:
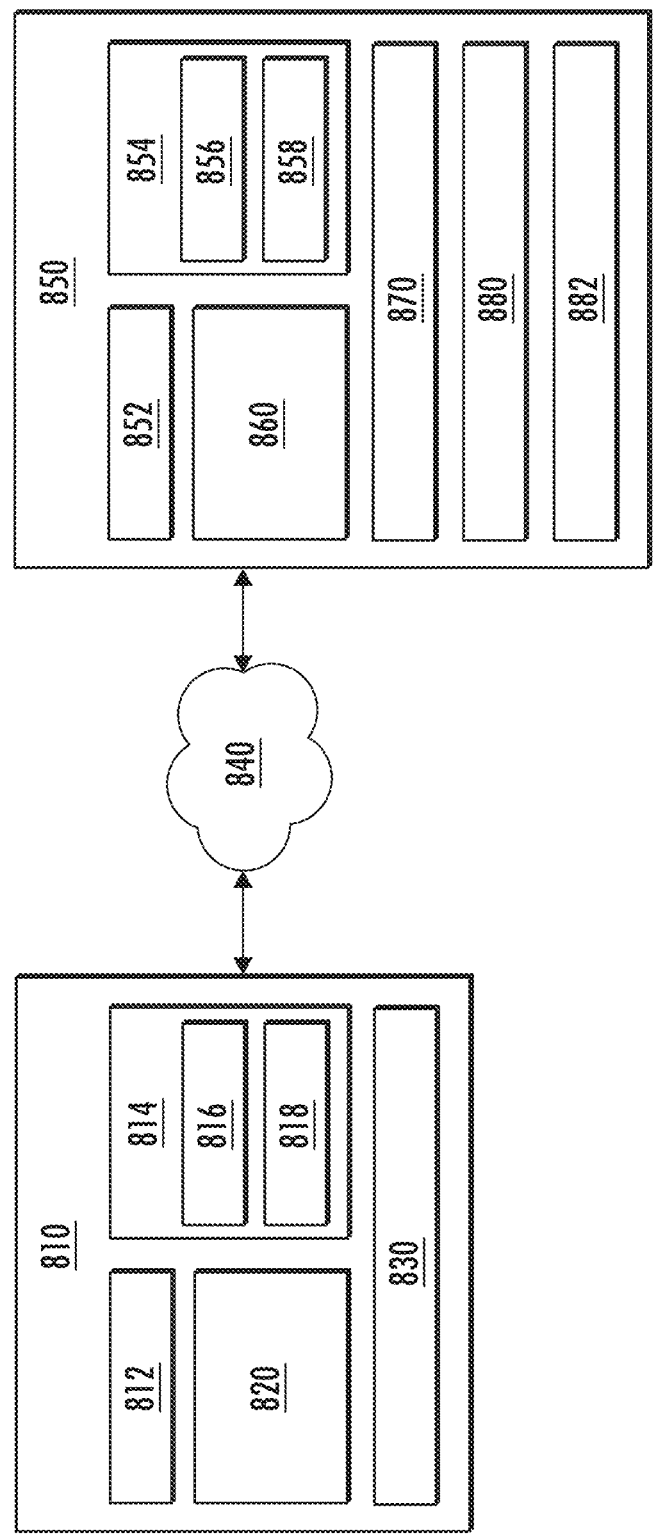
FIG. 7 depicts a block diagram of an example computing system according to example embodiments of the present disclosure.

FIG. 7 depicts a block diagram of an example computing system 800 according to example embodiments of the present disclosure. The example computing system 800 includes a computing system 810 and a machine learning computing system 850 that are communicatively coupled over a network 840.

In some implementations, the computing system 810 can perform various operations including map estimation, map fusion, sensor fusion, and object detection as described herein. In some implementations, the computing system 810 can be included in an autonomous vehicle (e.g., the vehicle 102 of FIG. 1). For example, the computing system 810 can be on-board the autonomous vehicle. In other implementations, the computing system 810 is not located on-board the autonomous vehicle. For example, the computing system 810 can operate offline to perform operations. Further, the computing system 810 can include one or more distinct physical computing devices.

The computing system 810 includes one or more processors 812 and a memory 814. The one or more processors 812 can be any suitable processing device (e.g., a processor core, a microprocessor, an ASIC, a FPGA, a controller, and/or a microcontroller) and can be one processor or a plurality of processors that are operatively connected. The memory 814 can include one or more non-transitory computer-readable storage media, including RAM, ROM, EEPROM, EPROM, one or more memory devices, flash memory devices, and/or combinations thereof.

The memory 814 can store information that can be accessed by the one or more processors 812. For instance, the memory 814 (e.g., one or more non-transitory computer-readable storage mediums, memory devices) can store data 816 that can be obtained, received, accessed, written, manipulated, created, and/or stored. The data 816 can include, for instance, data associated with the determination of object detections and intentions as described herein. In some implementations, the computing system 810 can obtain data from one or more memory devices that are remote from the system 810.

The memory 814 can also store computer-readable instructions 818 that can be executed by the one or more processors 812. The instructions 818 can be software written in any suitable programming language or can be implemented in hardware. Additionally, or alternatively, the instructions 818 can be executed in logically and/or virtually separate threads on the one or more processors 812.

For example, the memory 814 can store instructions 818 that when executed by the one or more processors 812 cause the one or more processors 812 to perform any of the operations and/or functions described herein, including, for example, determining object intentions.

According to an aspect of the present disclosure, the computing system 810 can store or include one or more machine-learned models 830. As examples, the machine-learned models 830 can be or can otherwise include various machine-learned models including, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 810 can receive the one or more machine-learned models 830 from the machine learning computing system 850 over the network 840 and can store the one or more machine-learned models 830 in the memory 814. The computing system 810 can then use or otherwise implement the one or more machine-learned models 830 (e.g., by the one or more processors 812). In particular, the computing system 810 can implement the one or more machine-learned models 830 to implement map estimation, sensor fusion, and/or object detection.

The machine learning computing system 850 includes one or more processors 852 and memory 854. The one or more processors 852 can be any suitable processing device (e.g., a processor core, a microprocessor, an ASIC, a FPGA, a controller, and/or a microcontroller) and can be one processor or a plurality of processors that are operatively connected. The memory 854 can include one or more non-transitory computer-readable storage media, including RAM, ROM, EEPROM, EPROM, one or more memory devices, flash memory devices, and/or combinations thereof.

The memory 854 can store information that can be accessed by the one or more processors 852. For instance, the memory 854 (e.g., one or more non-transitory computer-readable storage mediums, memory devices) can store data 856 that can be obtained, received, accessed, written, manipulated, created, and/or stored. The data 856 can include, for instance, data associated with the determination of the object intentions including detection outputs and forecasting outputs such as trajectory data, intent data, and/or the like as described herein. In some implementations, the machine learning computing system 850 can obtain data from one or more memory devices that are remote from the system 850.

The memory 854 can also store computer-readable instructions 858 that can be executed by the one or more processors 852. The instructions 858 can be software written in any suitable programming language or can be implemented in hardware. Additionally, or alternatively, the instructions 858 can be executed in logically and/or virtually separate threads on the one or more processors 852.

For example, the memory 854 can store instructions 858 that when executed by the one or more processors 852 cause the one or more processors 852 to perform any of the operations and/or functions described herein, including, for example, map estimation, map fusion, sensor fusion, object detection, and the like.

In some implementations, the machine learning computing system 850 includes one or more server computing devices. If the machine learning computing system 850 includes multiple server computing devices, such server computing devices can operate according to various computing architectures, including, for example, sequential computing architectures, parallel computing architectures, or some combination thereof.

In addition or alternatively to the one or more machine-learned models 830 at the computing system 810, the machine learning computing system 850 can include one or more machine-learned models 870. As examples, the one or more machine-learned models 870 can be or can otherwise include various machine-learned models including, for example, neural networks (e.g., deep convolutional neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 850 can communicate with the computing system 810 according to a client-server relationship. For example, the machine learning computing system 850 can implement the one or more machine-learned models 870 to provide a service to the computing system 810. For example, the service can provide for determining object intentions as described herein.

Thus the one or more machine-learned models 830 can be located and used at the computing system 810 and/or the one or more machine-learned models 870 can be located and used at the machine learning computing system 850.

In some implementations, the machine learning computing system 850 and/or the computing system 810 can train the machine-learned models 830 and/or 870 through use of a model trainer 880. The model trainer 880 can train the machine-learned models 830 and/or 870 using one or more training or learning algorithms. One example training technique involves implementation of the method 750 of FIG. 6. One example training technique is backwards propagation of errors. In some implementations, the model trainer 880 can perform supervised training techniques using a set of labeled training data. In other implementations, the model trainer 880 can perform unsupervised training techniques using a set of unlabeled training data. The model trainer 880 can perform a number of generalization techniques to improve the generalization capability of the models being trained. Generalization techniques include weight decays, dropouts, or other techniques.

In particular, the model trainer 880 can train the one or more machine-learned models 830 and/or the one or more machine-learned models 870 based on a set of training data 882. The training data 882 can include, for example, a set of map estimation training data for training a machine-learned map estimation model, which might include a first portion of data corresponding to LIDAR point cloud data as well as second portion of data corresponding to labels identifying ground truth geographic prior data. In other examples, training data 882 can include a set of sensor fusion training data for training a machine-learned sensor fusion model, which might include a first portion of data corresponding to first and second data streams (e.g., an image data stream and BEV LIDAR data stream) as well as a second portion of data corresponding to labels identifying ground truth feature map data. In other examples, training data 882 can include a set of object detector training data for training a machine-learned detector model, which might include a first portion of data corresponding to LIDAR data and/or feature maps as well as a second portion of data corresponding to labels identifying ground truth detector outputs (e.g., classifications and/or bounding shapes). The model trainer 880 can be implemented in hardware, firmware, and/or software controlling one or more processors.

The computing system 810 can also include a network interface 820 used to communicate with one or more systems or devices, including systems or devices that are remotely located from the computing system 810. The network interface 820 can include any circuits, components, and/or software, for communicating with one or more networks (e.g., the network 840). In some implementations, the network interface 820 can include, for example, one or more of a communications controller, receiver, transceiver, transmitter, port, conductors, software, and/or hardware for communicating data. Similarly, the machine learning computing system 850 can include a network interface 860.

The networks 840 can be any type of network or combination of networks that allows for communication between devices. In some embodiments, the network 840 can include one or more of a local area network, wide area network, the Internet, secure network, cellular network, mesh network, peer-to-peer communication link, and/or some combination thereof, and can include any number of wired or wireless links. Communication over the network 840 can be accomplished, for instance, via a network interface using any type of protocol, protection scheme, encoding, format, and/or packaging.

FIG. 7 illustrates one example computing system 800 that can be used to implement the present disclosure. Other computing systems can be used as well. For example, in some implementations, the computing system 810 can include the model trainer 880 and the training dataset 882. In such implementations, the machine-learned models 830 can be both trained and used locally at the computing system 810. As another example, in some implementations, the computing system 810 is not connected to other computing systems.

In addition, components illustrated and/or discussed as being included in one of the computing systems 810 or 850 can instead be included in another of the computing systems 810 or 850. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 8:
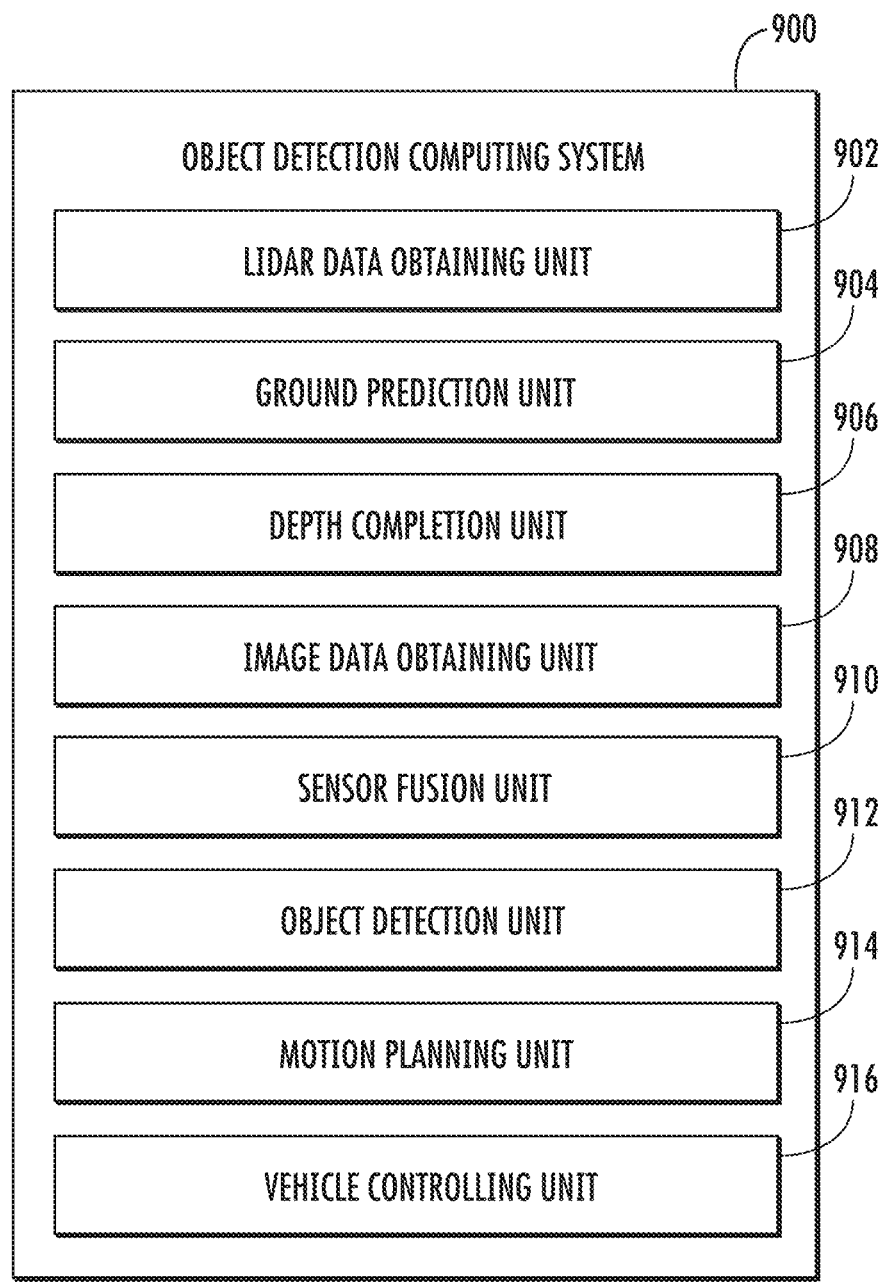
FIG. 8 depicts a block diagram of an example object detection computing system according to example embodiments of the present disclosure.

Various means can be additionally or alternatively configured to perform the methods and processes described herein. FIG. 8 depicts an example system 900 with units 902-916 for performing operations and functions according to example embodiments of the present disclosure. For example, an object detection computing system 900 can include LIDAR data obtaining unit(s) 902, ground prediction unit(s) 904, depth completion unit(s) 906, image data obtaining unit(s) 908, sensor fusion unit(s) 910, object detection unit(s) 912, motion planning unit(s) 914, vehicle controlling unit(s) 916, and/or other means for performing the operations and functions described herein. In some implementations, one or more of the units 902-916 may be implemented separately. In some implementations, one or more units 902-916 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain LIDAR point cloud data associated with an environment surrounding an autonomous vehicle. The means can be configured to project the LIDAR point cloud data to a bird's eye view representation of the LIDAR point cloud data. A LIDAR data obtaining unit 902 is one example of a means for obtaining such LIDAR point cloud data as described herein.

The means can be configured to predict ground data regarding the environment surrounding the autonomous vehicle. A ground prediction unit 904 is one example of a means for obtaining such geographic prior map data as described herein.

The means can be configured to generate depth completion data. A depth completion unit 906 is one example of a means for determining LIDAR data as described herein.

The means can be configured to obtain image data associated with an environment surrounding an autonomous vehicle. An image data obtaining unit 908 is one example of a means for obtaining such image data as described herein.

In some implementations, the means can be additionally or alternatively configured to implement continuous convolutions or other fusion techniques for multi-sensor fusion via a machine-learned neural network or other suitable means. For example, the means can be configured to generate first and second respective data streams associated with first and second sensor modalities. For example, the means can be configured to generate a first data stream descriptive of image data and a second data stream descriptive of LIDAR point cloud data. The means can be further configured to execute at the machine-learned neural network, one or more continuous convolutions to fuse the image features from the first data stream with the LIDAR features from the second data stream. More particularly, in some implementations, the means can be configured to receive a target data point associated with the image data, extract a plurality of source data points associated with the LIDAR point cloud data based on a distance of each source data point to the target data point (e.g., using a KNN pooling technique), and fuse information from the plurality of source data points in the one or more fusion layers to generate an output feature at the target data point (e.g., by concatenating a plurality of LIDAR features associated with the LIDAR point cloud data at the plurality of source data points). The means can also be configured to generate a feature map that includes the fused image features and LIDAR features. In some implementations, the feature map can be configured as a bird's eye view representation for subsequent analysis, which can advantageously maintain a data structure native to the 3D sensors such as LIDAR and facilitate training of machine-learned models employed in the corresponding fusion system. A sensor fusion unit 910 is one example of a means for implementing sensor fusion as described herein.

The means can be configured to detect three-dimensional objects of interest within the LIDAR data and/or feature map data. For example, the means can be configured to provide, as input to a machine-learned detector model, the LIDAR data and/or feature map data, and to receive, in response to providing the LIDAR data and/or feature map data as input to the machine-learned detector model, one or more detector outputs. The one or more detector outputs can include classifications and/or bounding shapes associated with object detections. An object detection unit 912 is one example of a means for determining three-dimensional object detections.

The means can be configured to determine a motion plan for the autonomous vehicle based at least in part on the detector output(s). The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit 914 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 916 is one example of a means for controlling motion of the autonomous vehicle to execute the motion plan.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for fusion of sensor data descriptive of an environment, the method comprising:
    generating a LIDAR feature map using a machine-learned LIDAR processing model and based at least in part on a LIDAR point cloud descriptive of a region of interest associated with the environment;
    generating an image feature map using a machine-learned image processing model and based at least in part on image data descriptive of the region of interest;
    fusing the LIDAR feature map and the image feature map; and
    generating, based on the fused LIDAR feature map and image feature map, a depth completion map descriptive of the region of interest;
    wherein the machine-learned LIDAR processing model and the machine-learned image processing model were jointly trained end-to-end based on a loss function evaluated at least in part by comparing reference depth completion maps and depth completion maps generated using the machine-learned LIDAR processing model and the machine-learned image processing model;
        wherein the machine-learned LIDAR processing model and the machine-learned image processing model were jointly trained end-to-end by:
            backpropagating the loss function through the machine-learned LIDAR processing model; and
            modifying, based on the backpropagation of the loss function, one or more weights associated with the machine-learned LIDAR processing model.

2. The method of claim 1, wherein:
    the LIDAR point cloud is represented in bird's-eye-view space;
    the image data is represented in two-dimensional image space; and
    the depth completion map is represented in bird's-eye-view space.

3. The method of claim 1, wherein the depth completion map is generated using a machined-learned depth-completion model.

4. The method of claim 2, wherein the depth completion map is generated by associating respective pixels of the fused LIDAR feature map and image feature map with respective locations in bird's-eye-view space.

5. The method of claim 2, wherein the depth completion map contains depth information not contained in the LIDAR point cloud.

6. The method of claim 1, wherein the region of interest corresponds to a subset of the sensor data.

7. The method of claim 1, comprising:
    determining a location for an object in the environment based at least in part on the depth completion map.

8. An autonomous vehicle control system for controlling an autonomous vehicle, the autonomous vehicle control system comprising:
    one or more processors; and
    one or more non-transitory computer-readable media storing instructions that are executable by the one or more processors to cause the autonomous vehicle control system to perform operations, the operations comprising:
        generating a LIDAR feature map using a machine-learned LIDAR processing model and based at least in part on a LIDAR point cloud descriptive of a region of interest associated with an environment;
        generating an image feature map using a machine-learned image processing model and based at least in part on image data descriptive of the region of interest;
        fusing the LIDAR feature map and the image feature map; and
        generating, based on the fused LIDAR feature map and image feature map, a depth completion map descriptive of the region of interest;
        wherein the machine-learned LIDAR processing model and the machine-learned image processing model were jointly trained end-to-end based on a loss function evaluated at least in part by comparing reference depth completion maps and depth completion maps generated using the machine-learned LIDAR processing model and the machine-learned image processing model;
    wherein the machine-learned LIDAR processing model and the machine-learned image processing model were jointly trained end-to-end by:
    backpropagating the loss function through the machine-learned LIDAR processing model; and
    modifying, based on the backpropagation of the loss function, one or more weights associated with the machine-learned LIDAR processing model.

9. The autonomous vehicle control system of claim 8, wherein:
    the LIDAR point cloud is represented in bird's-eye-view space;
    the image data is represented in two-dimensional image space; and
    the depth completion map is represented in bird's-eye-view space.

10. The autonomous vehicle control system of claim 8, wherein the depth completion map is generated using a machined-learned depth-completion model.

11. The autonomous vehicle control system of claim 9, wherein the depth completion map is generated by associating respective pixels of the fused LIDAR feature map and image feature map with respective locations in bird's-eye-view space.

12. The autonomous vehicle control system of claim 8, wherein the depth completion map contains depth information not contained in the LIDAR point cloud.

13. The autonomous vehicle control system of claim 8, wherein the region of interest corresponds to a subset of sensor data descriptive of the environment.

14. The autonomous vehicle control system of claim 8, wherein the operations comprise:
    determining a location for an object in the environment based at least in part on the depth completion map.

15. The autonomous vehicle control system of claim 14, wherein the operations comprise:
    generating a motion plan for the autonomous vehicle based at least in part on the location; and
    controlling the autonomous vehicle according to the motion plan.

16. One or more non-transitory computer-readable media storing instructions that are executable by one or more processors to cause an autonomous vehicle control system to perform operations, the operations comprising:
    generating a LIDAR feature map using a machine-learned LIDAR processing model and based at least in part on a LIDAR point cloud descriptive of a region of interest associated with an environment;
    generating an image feature map using a machine-learned image processing model and based at least in part on image data descriptive of the region of interest;
    fusing the LIDAR feature map and the image feature map; and
    generating, based on the fused LIDAR feature map and image feature map, a depth completion map descriptive of the region of interest;
    wherein the machine-learned LIDAR processing model and the machine-learned image processing model were jointly trained end-to-end based on a loss function evaluated at least in part by comparing reference depth completion maps and depth completion maps generated using the machine-learned LIDAR processing model and the machine-learned image processing model;
    wherein the machine-learned LIDAR processing model and the machine-learned image processing model were jointly trained end-to-end by:
        backpropagating the loss function through the machine-learned LIDAR processing model; and
        modifying, based on the backpropagation of the loss function, one or more weights associated with the machine-learned LIDAR processing model.

17. The one or more non-transitory computer-readable media of claim 16, wherein:
    the LIDAR point cloud is represented in bird's-eye-view space;
    the image data is represented in two-dimensional image space; and
    the depth completion map is represented in bird's-eye-view space.

18. The one or more non-transitory computer-readable media of claim 17, wherein the depth completion map is generated by associating respective pixels of the fused LIDAR feature map and image feature map with respective locations in bird's-eye-view space.

19. The one or more non-transitory computer-readable media of claim 16, wherein the operations comprise:
    determining a location for an object in the environment based at least in part on the depth completion map.

20. The method of claim 1, wherein the machine-learned LIDAR processing model and the machine-learned image processing model were jointly trained end-to-end by:
    computing the loss function to measure a difference between a reference depth completion map and a depth completion map generated using the fused LIDAR feature map and image feature map;
    backpropagating the loss function through:
        the machine-learned LIDAR processing model, and
        the machine-learned image processing model; and
    modifying, based on the backpropagation of the loss function:
        one or more weights associated with the machine-learned LIDAR processing model; and
        one or more weights associated with the machine-learned image processing model.

\* \* \* \* \*